Sept. 11, 1951 W. L. WEBSTER 2,567,913
INTERCHANGEABLE REPLACEMENT SEAT COVER
Filed Jan. 12, 1950
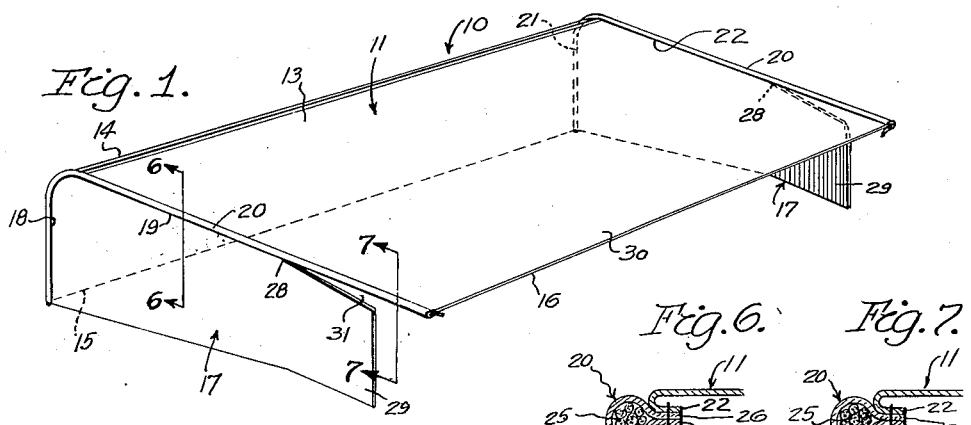
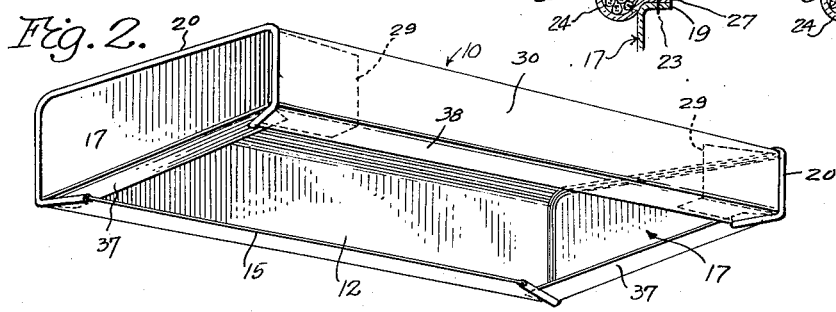
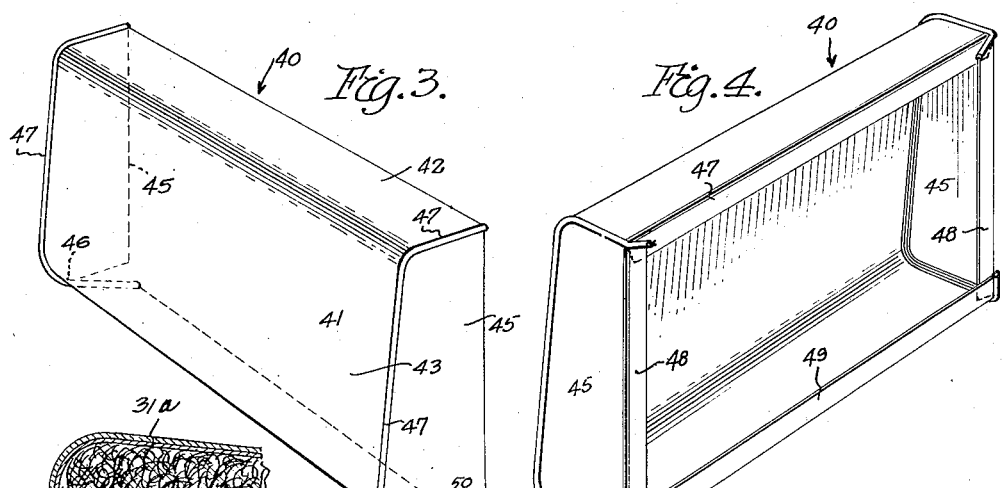
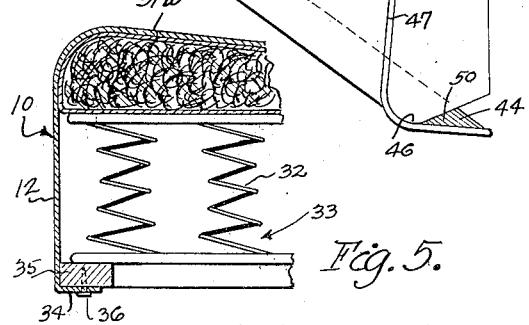
Inventor
Winfield L. Webster
Barthel & Bugbee
Attorneys Patented Sept. 11, 1951

2,567,913

UNITED STATES PATENT OFFICE 2,567,913

INTERCHANGEABLE REPLACEMENT SEAT COVER

Winfield L. Webster, Grosse Pointe, Mich.

Application January 12, 1950, Serial No. 138,199

9 Claims. (Cl. 155—182)

1

This invention relates to seat covers and in particular, to vehicle seat covers.

In the selling of used motor vehicles and especially trucks, the dealer has hitherto been faced with the difficult problem of how to renovate the seat and back cushions without involving too much expense which would seriously cut down his profit. Truck seat and back cushions receive very hard wear, and often the cushions are very dilapidated when the rest of the truck is in good condition. Moreover, the ordinary dealer is able to refinish the interior of a truck cab by spray painting in his own shop, whereas for upholstery repairs, he is obliged to send it to a so-called "trim shop," since he has neither the facilities or equipment for making upholstery repairs. Moreover, if he handles new trucks of one particular make, he finds it difficult to obtain replacement cushions for other makes of trucks except at a price which makes such replacement unprofitable to him. About three-quarters of the sales of trucks commonly sold on the American market comprise three different makes whose cushions vary slightly in dimensions so that upholstery repairmen in using ordinary upholstery methods, must virtually tailor each replacement cover to the dimensions of the particular cushion.

The present invention, however, provides a single interchangeable cover for truck seat cushions and another single interchangeable replacement cover for truck back cushions which will fit all three makes of cushions. regardless of their differences in dimensions.

One object of this invention is to provide an interchangeable vehicle cushion cover which will replace worn cushion upholstery and which is readily adaptable, without change, to varying sizes of vehicle cushions, including both seat cushions and back cushions.

Another object is to provide an interchangeable replacement cushion cover of the foregoing character which will have the appearance of a seat cover which has been specially made for that particular cushion, yet which can also be used for other sizes of cushions, thereby enabling one size of seat cushion or back cushion cover to be used to repair seat cushions or back cushions of different makes of vehicles, particularly trucks.

In the drawings:

Figure 1 is a top perspective view of a replaceable seat cushion cover before installation. according to the invention, looking from the rear thereof, with the cushion omitted;

Figure 2 is a bottom perspective view of the

2 replaceable seat cushion cover shown in Figure 1, after installation, looking upward from the rear toward the front of the cushion, with the cushion itself omitted;

Figure 3 is a front perspective view of a replaceable back cushion cover before installation, according to the invention, looking downward from one side thereof;

Figure 4 is a rear perspective view of the replaceable back cushion cover shown in Figure 3, after installation, looking from the rear thereof, with the cushion itself omitted;

Figure 5 is a fragmentary vertical section through the front portion of a vehicle seat cushion, showing the front portion of the replaceable seat cushion cover;

Figure 6 is an enlarged fragmentary cross-section taken along the line 6—6 in Figure 1; and Figure 7 is an enlarged fragmentary cross-section taken along the line 7—7 in Figure 1.

Referring to the drawings in detail, Figures 1, 2, 5, 6 and 7 show an interchangeable seat cover, generally designated 10, for the seat cushions of vehicles, particularly trucks, as consisting of a main or top member 11 of sheet material having an approximately vertical front or minor part 12 which is normally exposed during the ordinary use of the seat cushion and a slightly rearwardly inclined upper part 13 connected to one another at a rounded forward edge portion 14 and terminating in lower and upper edges 15 and 16, the upper edge 16 being located at the rear of the cover 10. Secured to the opposite ends of the top portion 11 are side members or side facings 17 having forward edges 18 and upper edges 19 secured to the main or top member 11 with a welt 20 therebetween. The forward and upper side edges 21 and 22 of the upper portion 11 of the seat cover are permanently sewed respectively to the forward and upper edges 18 and 19 of the side members 17 with the welt 20 between them (Figure 6), as by one or more rows of stitching 23.

The welt 20 itself consists of an outer cover 24 formed by bending a strip of seat material, such as artificial leather, into approximately circular cross-section around a core 25 composed of cords or paper, especially stranded paper cable. The free edges 26 and 27 of the welt cover 24 are brought face to face and inserted between the inwardly-turned edges 18, 21 and 19, 22 of the top and side members 11 and 17 respectively (Figure 6). At a suitable location, determined by the minimum width of seat cushion to be recovered, such as the point 28 on each side of the seat cover 10, the connection between the welt 20 and the side member 17 is terminated, beyond which the welt 20 is attached to the top member 11 alone from the point 28 rearwardly to the rearward edge 16 (Figure 7), the same row of stitching 23 serving to hold the free edges 26 and 27 of the welt 20 in connection with the top edge 22. The rearward parts of the side members 17 thus constitute side flaps 29, whereas the corresponding top portion constitutes a top flap 30. A slit 31 runs from the point 28 rearwardly between the top member 11 and side members 17 which becomes a normally-concealed rear flap during the ordinary use of the seat cushion, as described below.

It should be mentioned at this point that the three different principal makes of trucks have seat cushions in which the angle between the front and top portions 12 and 13 is practically the same although the front portions 12 vary in height and the top portions 13 vary in width back to the rear edge 16.

To install the interchangeable seat cover 10, the workman first removes the existing cover or upholstery fabric, which may be torn or worn away or have holes therein. He then replaces the padding 31a where necessary (Figure 5) and also such coil springs 32 as may require replacement. With these preliminaries disposed of, he then stretches the cover 10 over the seat cushion, generally designated 33, starting from the front thereof and working toward the rear. The seat cover 10 is first fitted to the seat cushion at the front 12 and upper forward edge 14, and pulled backward, smoothing out the wrinkles, the excess lower edge portion 34 of the front portion 12 being bent under the bottom cushion frame member 35 and secured in any suitable way as at 36 (Figure 5). The excess side portions 37 are similarly bent underneath the cushion and similarly secured (Figure 2). The side flaps 29 are then folded behind the rearward edge of the cushion, after which the rear flap 30, including its welt 20, is stretched down over the folded side portions or flaps 29 and its excess 38 likewise secured to the bottom of the cushion, as by tacks (not shown). In this manner, the welt 20 continues down along the end of the cushion and gives a finished appearance to it, just as if it were permanently sewed to the side members 17. A slight variation in the overall length of the cushion 33 is immaterial since the welt 20 merely rides up or down on the cushion a slight amount. In practice, it is found that the three leading makes of trucks have seat cushions of heights from 5 to 8 inches, of widths from 18 to 22 inches, and with lengths varying 2 to 3 inches overall. The present interchangeable seat cover 10 is instantly adaptable to all of these and gives a finished appearance as if it were especially made for a particular cushion.

The back cushion cover, generally designated 40, is generally similar to the seat cushion cover 10 except that the excess material is taken care of at the bottom of the cushion, which is the thickest part of the cushion, rather than at the top which is the thin part. The back cushion cover 40 has a top portion 41 which is divided into an upper portion 42 which is normally exposed during the ordinary use of the back cushion, a back portion 43 and a lower side portion 44 which is normally concealed during the ordinary use of the back cushion. These are secured to side portions 45 in the manner similar to that previously described in connection with the seat cushion cover 10 and shown in Figures 6 and 7. The connection between the side and top portions 45 and 41 is terminated at the points 46, the welt 47 continuing separately along the lower portion 44 to the rearward edge thereof. The welt 47 and its mode of attachment are identical to the welt 20 as shown in Figures 6 and 7.

In the installation of the back cushion cover 40, the cover is first applied to the upper edge of the cushion and the excess material folded over at the flap 47 and secured in the foregoing manner, such as by the use of tacks similar to those shown in Figure 5. The side portions 45 are then stretched around the ends of the cushion and their excess flaps 48 similarly secured (Figure 4). The bottom flap 44 is then stretched snugly and tightly around the cushion, and its excess flap 49 similarly secured to the cushion, the welt 47 giving the appearance of a permanent attachment despite the presence of the slit 50 between the flap 44 and the side portion 45 at this location. If there is any excess of material, in the side portions 45 adjacent the slit 50, it can be folded underneath in the same manner.

Thus, the invention provides interchangeable seat cushion covers which can be instantly adapted to either the seat cushions or back cushions of trucks of different makes. The installation of the seat cushion cover 10 and back cushion cover 40 follow a similar procedure since these covers are constructed in a similar manner. Instead of tacking the various flaps and surplus portions to the seat cushion frame, these may be attached thereto by so-called hog rings, which are split rings threaded through the material and clinched around the seat cushion frame members.

What I claim is:

1. An interchangeable vehicle cushion cover comprising an elongated main cover member having a normally exposed elongated minor portion extending transversely thereto from a longitudinal edge thereof, and elongated side members connected to the opposite lateral edges of said main member, one of the short edges of each side member being connected to a short edge of said minor portion and one of the long edges of each side member being connected to a lateral edge of said main member along a part only of said lateral edge, said long edge of said side member having a separated edge portion which is disconnected from said lateral edge of said main member commencing at a location remote from said minor portion and continuing throughout the remainder of its extent.

2. An interchangeable vehicle cushion cover comprising an elongated main cover member having a normally exposed elongated minor portion extending transversely thereto from a longitudinal edge thereof, elongated side members connected to the opposite lateral edges of said main member, one of the short edges of each side member being connected to a short edge of said minor portion and one of the long edges of each side member being connected to a lateral edge of said main member along a part only of said lateral edge, said long edge of said side member having a separated edge portion which is disconnected from said lateral edge of said main member commencing at a location remote from said minor portion and continuing throughout the remainder of its extent, and an elongated welt interposed and connected between said main member and each of said side members along their common connected edges.

3. An interchangeable vehicle cushion cover comprising an elongated main cover member having a normally-exposed elongated minor portion extending transversely thereto from a longitudinal edge thereof, elongated side members connected to the opposite lateral edges of said main member, one of the short edges of each side member being connected to a short edge of said minor portion and one of the long edges of each side member being connected to a lateral edge of said main member along a part only of said lateral edge, said long edge of said side member having a separated edge portion which is disconnected from said lateral edge of said main member commencing at a location remote from said minor portion and continuing throughout the remainder of its extent, and an elongated welt interposed and connected between said main member and each of said side members along their common connected edges, said welt being connected to the remainder of the lateral edges of said main member at the locations where they are disconnected from said side members.

4. An interchangeable vehicle cushion cover comprising an elongated main cover member having a normally-exposed elongated minor portion extending transversely thereto from a longitudinal edge thereof, elongated side members connected to the opposite lateral edges of said main member, one of the short edges of each side member being connected to a short edge of said minor portion and one of the long edges of each side member being connected to a lateral edge of said main member along a part only of said lateral edge, said long edge of said side member having a separated edge portion which is disconnected from said lateral edge of said main member commencing at a location remote from said minor portion and continuing throughout the remainder of its extent, said connected edges having inwardly turned substantially parallel edge portions, and an elongated welt having inwardly directed edge portions interposed and connected between said inwardly turned edge portions.

5. An interchangeable vehicle cushion cover comprising an elongated main cover member having a normally-exposed elongated minor portion extending transversely thereto from a longitudinal edge thereof, and elongated side members connected to the opposite lateral edges of said main member, one of the short edges of each side member being connected to a short edge of said minor portion and one of the long edges of each side member being connected to a lateral edge of said main member along a part only of said lateral edge, said long edge of said side member having a separated edge portion which is disconnected from said lateral edge of said main member commencing at a location remote from said minor portion and continuing throughout the remainder of its extent, the longitudinal side of said cushion cover opposite said minor portion being open.

6. An interchangeable vehicle cushion cover comprising an elongated cover member having a normally-exposed elongated minor portion extending transversely thereto from a longitudinal edge thereof, and elongated side members connected to the opposite lateral edges of said main member, one of the short edges of each side member being connected to a short edge of said minor portion and one of the long edges of each side member being connected to a lateral edge of said main member along a part only of said lateral edge, said long edge of said side member having a separated edge portion which is disconnected from said lateral edge of said main member commencing at a location remote from said minor portion and continuing throughout the remainder of its extent, the disconnected portions of said side members being folded substantially perpendicularly thereto and the disconnected portion of said main member being folded transversely thereto against said disconnected side member portions.

7. An interchangeable vehicle cushion cover comprising an elongated main cover member having a normally-exposed elongated minor portion extending transversely thereto from its opposite longitudinal edges, and elongated side members connected to the opposite lateral edges of said main member, one of the short edges of each side member being connected to a short edge of said minor portion and one of the long edges of each side member being connected to a lateral edge of said main member, the other short edge of each side member having a separated edge portion which is disconnected from the lateral edge of the adjacent minor portion.

8. An interchangeable vehicle cushion cover comprising an elongated main cover member having a normally-exposed elongated minor portion extending transversely thereto from its opposite longitudinal edges, elongated side members connected to the opposite lateral edges of said main member, one of the short edges of each side member being connected to a short edge of said minor portion and one of the long edges of each side member being connected to a lateral edge of said main member, the other short edge of each side member having a separated edge portion which is disconnected from the lateral edge of the adjacent minor portion, and an elongated welt interposed and connected between said main member and each of said side members along their common connected edges.

9. An interchangeable vehicle cushion cover comprising an elongated main cover member having a normally-exposed elongated minor portion extending transversely thereto from its opposite longitudinal edges, elongated side members connected to the opposite lateral edges of said main member, one of the short edges of each side member being connected to a short edge of said minor portion and one of the long edges of each side member being connected to a lateral edge of said main member, the other short edge of each side member having a separated edge portion which is disconnected from the lateral edge of the adjacent minor portion, and an elongated welt interposed and connected between said main member and each of said side members along their common connected edges, said welt being connected to the remainder of the lateral edges of said main member at the locations where they are disconnected from said side members.

WINFIELD L. WEBSTER.

REFERENCES CITED

The following references are of record in the file of this patent:

UNITED STATES PATENTS

| Number | Name | Date |
|---|---|---|
| 1,619,556 | Aaron | Mar. 1, 1927 |
| 1,840,995 | Wishmeir | Jan. 12, 1932 |
| 1,996,575 | Fry et al. | Apr. 2, 1935 |
| 2,245,779 | Heil | June 27, 1941 |